US011684990B2

(12) United States Patent
Rappl et al.

(10) Patent No.: US 11,684,990 B2
(45) Date of Patent: Jun. 27, 2023

(54) SYSTEMS AND METHODS FOR WELDING ASSET IDENTIFICATION

(71) Applicant: ILLINOIS TOOL WORKS INC., Glenview, IL (US)

(72) Inventors: James Francis Rappl, Neenah, WI (US); Todd Holverson, Appleton, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 16/935,803

(22) Filed: Jul. 22, 2020

(65) Prior Publication Data

US 2021/0060681 A1 Mar. 4, 2021

Related U.S. Application Data

(60) Provisional application No. 62/893,459, filed on Aug. 29, 2019.

(51) Int. Cl.
*G06Q 30/00* (2023.01)
*B23K 9/095* (2006.01)
(Continued)

(52) U.S. Cl.
CPC ........ *B23K 9/0953* (2013.01); *G05B 19/4063* (2013.01); *G06Q 10/087* (2013.01);
(Continued)

(58) Field of Classification Search
None
See application file for complete search history.

(56) References Cited

U.S. PATENT DOCUMENTS 6,267,291 B1 7/2001 Blankenship et al.
6,479,792 B1 11/2002 Beiermann et al.
(Continued)

FOREIGN PATENT DOCUMENTS

CN 102749900 10/2012
EP 3247525 11/2017
(Continued)

OTHER PUBLICATIONS

European Patent Office, Extended European Search Report, Application No. 20190175.8, dated Mar. 4, 2021, 5 pages.
(Continued)

*Primary Examiner* — Luis A Brown
(74) *Attorney, Agent, or Firm* — McAndrews, Held & Malloy, Ltd.

(57) ABSTRACT

Systems and methods for welding asset tracking are disclosed. In some examples, a welding asset tracking system may comprise an asset tracking network of tags, hubs, and/or gateways retained by welding assets within a welding area. The asset tracking network may obtain and/or communicate to an asset tracking server welding data related to one or more of the welding assets, as well as position data obtained via an internal and/or external positioning system. In this way, the welding asset tracking server may continually receive updated information regarding each welding assets identity, location, and/or use. The asset tracking server may additionally send a command to a selected welding asset that causes an interface of the selected welding asset to emit an output that enables an operator to physically identify the welding asset.

20 Claims, 6 Drawing Sheets

(51) Int. Cl.
*H04W 4/029* (2018.01)
*G06Q 10/087* (2023.01)
*G05B 19/4063* (2006.01)
*H04L 12/66* (2006.01)

(52) U.S. Cl.
CPC ... *H04W 4/029* (2018.02); *G05B 2219/34215* (2013.01); *G05B 2219/45135* (2013.01); *H04L 12/66* (2013.01)

(56) References Cited

U.S. PATENT DOCUMENTS

| | | | |
|---|---|---|---|
| 6,536,660 | B2 | 3/2003 | Blankenship et al. |
| 6,686,318 | B1 | 2/2004 | Andree et al. |
| 6,748,776 | B2 | 6/2004 | Bullock et al. |
| 7,032,814 | B2* | 4/2006 | Blankenship .... G06K 19/07749 235/375 |
| 7,363,137 | B2* | 4/2008 | Brant ................... H04W 4/029 340/988 |
| 8,090,477 | B1* | 1/2012 | Steinberg ........... G05D 23/1905 700/278 |
| 8,748,776 | B2* | 6/2014 | Albrecht ............ G05B 19/4063 219/130.01 |
| 9,119,023 | B2 | 8/2015 | Dina et al. |
| 9,129,330 | B2 | 9/2015 | Albrecht et al. |
| 9,138,825 | B2 | 9/2015 | Albrecht et al. |
| 9,167,408 | B2* | 10/2015 | Bucci ................. H04L 12/2809 |
| 9,204,257 | B1* | 12/2015 | Mendelson .......... H04W 4/024 |
| 9,270,520 | B2* | 2/2016 | Dina ....................... H04L 41/00 |
| 9,449,498 | B2 | 9/2016 | Dina et al. |
| 9,652,955 | B1* | 5/2017 | Ray ......................... G06Q 10/08 |
| 9,712,947 | B2* | 7/2017 | Dina .................... B23K 9/1087 |
| 9,756,456 | B2 | 9/2017 | Dina et al. |
| 9,817,947 | B2* | 11/2017 | Hermans ................ G16H 10/65 |
| 9,862,048 | B2* | 1/2018 | Holverson .............. B23K 9/10 |
| 9,998,804 | B2 | 6/2018 | Awiszus |
| 10,286,475 | B2* | 5/2019 | Dina ....................... H04W 4/70 |
| 10,419,929 | B2 | 9/2019 | Dina et al. |
| 2007/0080153 | A1* | 4/2007 | Albrecht ............. B23K 9/1062 219/130.01 |
| 2010/0039317 | A1* | 2/2010 | Cameron ............... G06Q 10/08 342/357.62 |
| 2011/0004072 | A1* | 1/2011 | Fletcher ............... A61B 5/6804 600/300 |
| 2011/0080267 | A1 | 4/2011 | Clare et al. |
| 2013/0200055 | A1* | 8/2013 | Enyedy .................. B23K 9/124 219/130.21 |
| 2014/0048522 | A1* | 2/2014 | Dina .................... B23K 9/1087 219/132 |
| 2014/0049382 | A1* | 2/2014 | Dina ................... H04W 56/001 340/12.5 |
| 2014/0051358 | A1* | 2/2014 | Dina ...................... B23K 9/322 455/41.2 |
| 2014/0051359 | A1* | 2/2014 | Dina ....................... H04W 4/80 455/41.2 |
| 2014/0124493 | A1* | 5/2014 | Enyedy ................ B23K 9/1006 219/137 PS |
| 2014/0240125 | A1* | 8/2014 | Burch ...................... B25H 3/02 340/539.13 |
| 2014/0284323 | A1 | 9/2014 | Albrecht et al. |
| 2015/0114941 | A1* | 4/2015 | Denis ..................... G08C 17/00 219/132 |
| 2015/0177731 | A1* | 6/2015 | Mader .................. G05B 19/402 700/114 |
| 2015/0375323 | A1 | 12/2015 | Becker |
| 2016/0045971 | A1* | 2/2016 | Holverson .............. G06F 21/35 219/136 |
| 2016/0219405 | A1 | 7/2016 | Mishra et al. |
| 2016/0236308 | A1* | 8/2016 | Suzuyama ............... B23Q 7/14 |
| 2016/0318114 | A1* | 11/2016 | Kowaleski ............. B23K 9/322 |
| 2016/0373457 | A1 | 12/2016 | Matson et al. |
| 2017/0039517 | A1* | 2/2017 | Amann ................... H04B 17/23 |
| 2017/0214117 | A1* | 7/2017 | Gracyk ................. G01S 13/767 |
| 2017/0244594 | A1* | 8/2017 | Shiota ................. H04W 12/122 |
| 2017/0262947 | A1* | 9/2017 | Erestam ........... G06Q 10/06313 |
| 2018/0124558 | A1* | 5/2018 | Stampfl ................... H04W 8/14 |
| 2018/0130377 | A1* | 5/2018 | Meess .................. B23K 9/1093 |
| 2019/0070686 | A1 | 3/2019 | Kooken et al. |
| 2019/0210135 | A1 | 7/2019 | Dina et al. |
| 2019/0285299 | A1* | 9/2019 | Steinberg ........... G05D 23/1951 |
| 2020/0262009 | A1* | 8/2020 | Becker ................. B23K 31/125 |
| 2021/0060681 | A1* | 3/2021 | Rappl ..................... H04W 4/80 |

FOREIGN PATENT DOCUMENTS

| | | | | |
|---|---|---|---|---|
| EP | 3318361 | A1 * | 5/2018 | ............... A61F 9/06 |
| EP | 3247525 | B1 * | 3/2020 | ............. B23K 9/095 |
| EP | 3326394 | B1 * | 9/2021 | .......... G01S 5/0284 |
| JP | H1148340 | | 2/1999 | |
| KR | 20090128646 | | 12/2009 | |
| WO | 2013163338 | | 10/2013 | |
| WO | WO-2017164794 | A1 * | 9/2017 | ............... G05B 9/00 |

OTHER PUBLICATIONS

European Patent Office, Extended European Search Report, Application No. 20190185.7, dated Mar. 4, 2021, 5 pages.
European Patent Office, Extended European Search Report, Application No. 20191265.6, dated Mar. 9, 2021, 7 pages.
European Patent Office, Extended European Search Report, Application No. 20191250.8, dated Mar. 4, 2021, 11 pages.
European Patent Office, Extended European Search Report, Application No. 20191258.1, dated Mar. 9, 2021, 6 pages.
Tile, Inc., "Find Your Keys, Wallet & Phone with Tile's App and Bluetooth Tracker Device", retrieved from https://www.thetileapp.com/en-us/, retrieved on Jul. 9, 2020, 12 pages.
Milwaukee Tool, "TICK Tool and Equipment Tracker—48-21-2000," retrieved from https://milwaukeetool.com/Prodcuts/Power-Tools/48-21-2000, retrieved on Jul. 9, 2020, 6 pages.
Canada Patent Office, Examination Report, Application No. 3,089,986, dated Sep. 2, 2021, 2 pages.
Canada Patent Office, Examination Report, Application No. 3,088,377, dated Nov. 2, 2021, 8 pages.
European Patent Office, Office Action, Appln No. 20191250.8, dated Jan. 31, 2022, 5 pages.
European Patent Office, Office Action, Application No. 20190175.8, dated Feb. 11, 2022, 4 pages.
European Patent Office, Office Action, Application No. 20191258.1, dated Feb. 11, 2022, 4 pages.
European Patent Office, Office Action, Application No. 20191265.6, dated Feb. 11, 2022, 4 pages.
European Patent Office, Office Action, Application No. 20190185.7, dated Feb. 11, 2022, 5 pages.
European Patent Office, Office Action, Application No. 20190175.8, dated Oct. 20, 2022, 5 pages.
European Patent Office, Office Action, Application No. 20190185.7, dated Oct. 20, 2022, 5 pages.

* cited by examiner

SYSTEMS AND METHODS FOR WELDING ASSET IDENTIFICATION

CROSS REFERENCE TO RELATED APPLICATIONS

This application claims priority from, and the benefit of, U.S. Provisional Application Ser. No. 62/893,459 entitled "SYSTEMS AND METHODS FOR WELDING ASSET IDENTIFICATION," filed Aug. 29, 2019, the entirety of which is hereby incorporated by reference.

TECHNICAL FIELD

The present disclosure generally relates to systems and methods for welding asset identification.

BACKGROUND

Numerous welding assets may be employed in large welding environments, such as construction sites, factories, manufacturing yards, and shipyards. As welding assets of similar types can be difficult to distinguish from one another, locating a particular welding asset in a large welding environment, or across multiple welding environments, can be difficult and time consuming.

Limitations and disadvantages of conventional and traditional approaches will become apparent to one of skill in the art, through comparison of such systems with the present disclosure as set forth in the remainder of the present application with reference to the drawings.

BRIEF SUMMARY

The present disclosure is directed to systems and methods for welding asset identification, substantially as illustrated by and/or described in connection with at least one of the figures, and as set forth in the claims.

These and other advantages, aspects and novel features of the present disclosure, as well as details of an illustrated example thereof, will be more fully understood from the following description and drawings.

Figure 1:
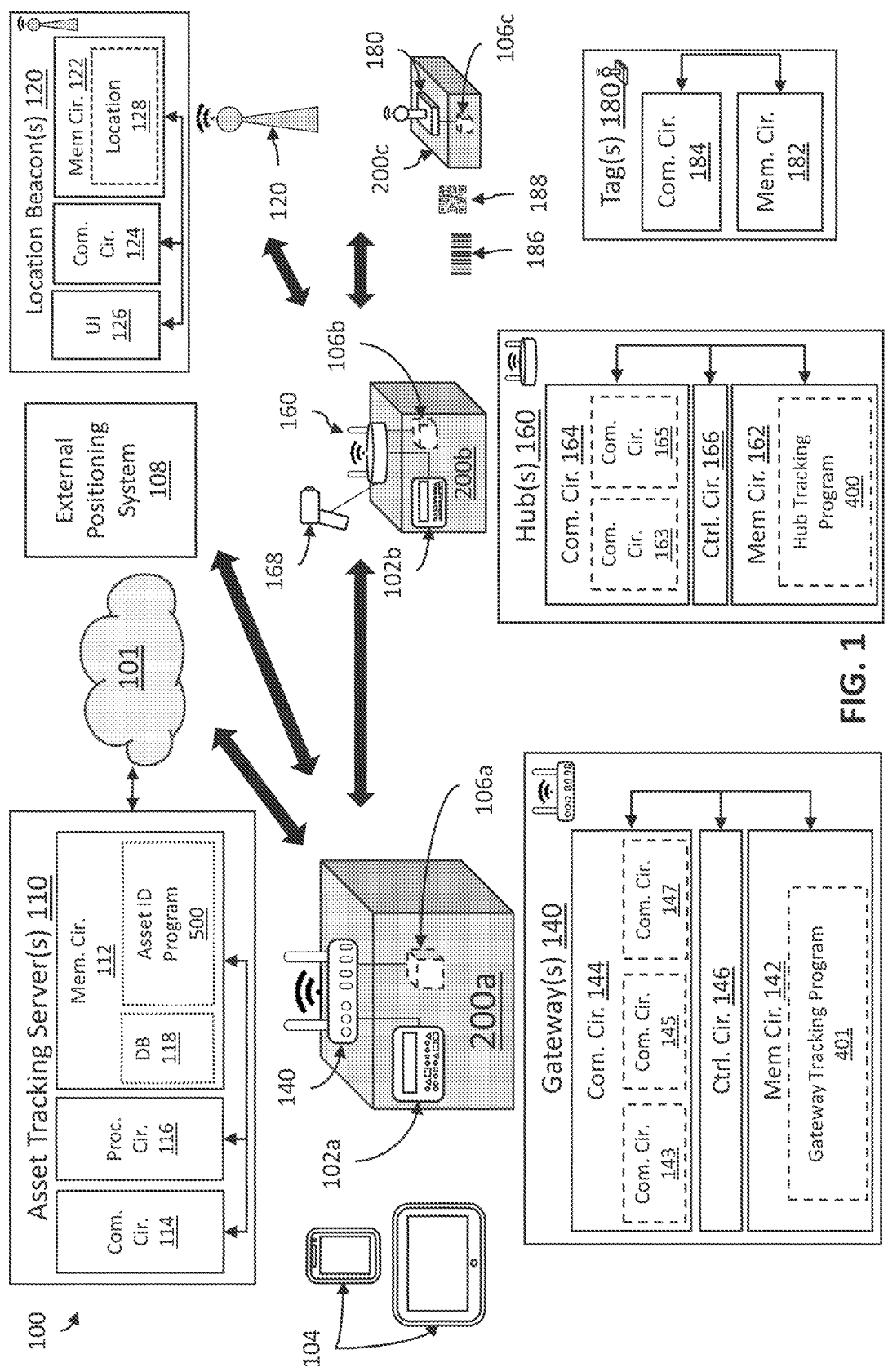
FIG. 1 depicts a welding asset tracking system, in accordance with aspects of this disclosure.

The figures are not necessarily to scale. Where appropriate, the same or similar reference numerals are used in the figures to refer to similar or identical elements. For example, reference numerals utilizing lettering (e.g., sensor 106a, sensor 106b) refer to instances of the same reference numeral that does not have the lettering (e.g., sensors 106).

DETAILED DESCRIPTION

Some examples of the present disclosure relate to a welding asset tracking system. In some examples, the welding asset tracking system may comprise an asset tracking network of tags, hubs, and/or gateways retained by welding assets within a welding area. The asset tracking network may obtain and/or communicate (e.g., to an asset tracking server) welding data related to one or more of the welding assets, as well as position data obtained via an internal and/or external positioning system. In this way, the welding asset tracking server may continually receive updated information regarding each welding assets identity, location, and/or use. By retaining the asset tracking network within welding assets, the asset tracking network becomes more likely to have the density necessary for continuous tracking, since welding assets tend to be positioned near other welding assets so that they can be used together. The information obtained by the welding asset tracking system may be used by a welding asset manager to locate and/or identify welding assets.

Some examples of the present disclosure relate to a method of identifying a welding asset, comprising receiving, at a welding asset tracking server, a selection signal representative of a selection of a particular welding asset, and sending to the particular welding asset, via communication circuitry of the welding asset tracking server, a command for the particular welding asset to emit a perceptible output through an interface of the particular welding asset.

In some examples, the method further comprises determining a welding area, determining, via a welding asset tracking database, one or more welding assets located in or near the welding area, and sending, via the communication circuitry, a signal representative of the one or more welding assets, wherein the one or more welding assets comprise the particular welding asset. In some examples, determining the welding area comprises receiving a position signal representative of a position of a user device, and determining, via the welding asset tracking database and processing circuitry of the weld asset tracking server, the welding area that is nearest to the position of the user device. In some examples, the one or more welding assets comprise one or more of a wire feeder, welding power supply, operator badge, welding helmet, air-purifying respirator, welding wire spool, welding wire barrel, work order, workpiece, welding gun, grinder, fume extractor, foot pedal, gas bottle regulator, power supply pendant, welding cable, or sensor module. In some examples, the particular welding asset comprises a wire feeder or welding power supply.

In some examples, receiving the selection signal representative of the selection of the particular welding asset comprises receiving a position signal representative of a position of a user device, receiving, from the user device, a type signal representative of a selected type of welding asset, and determining, via the welding asset tracking database and processing circuitry of the welding asset tracking server, the particular welding asset of the selected type that is nearest the position of the user device. In some examples, the welding asset tracking database comprises a data structure storing locations of one or more welding assets. In some examples, sending the command signal comprises sending the command signal via an asset tracking network. In some examples, the asset tracking network comprises at least one welding asset retaining a gateway in communication with the welding asset tracking server. In some examples, the gateway is in direct or indirect communication with a hub or a second gateway retained by the particular welding asset.

Some examples of the present disclosure relate to a welding asset tracking system, comprising a welding asset tracking network comprising at least one welding asset retaining a gateway, and a welding asset tracking server comprising communication circuitry in communication with the welding asset tracking network, the communication circuitry configured to receive a selection signal representative of a selection of a particular welding asset, and send to the particular welding asset, via the welding asset tracking network, a command for the particular welding asset to emit a perceptible output through an interface of the particular welding asset.

In some examples, the system further comprises a welding asset tracking database, wherein the welding asset tracking server further comprises processing circuitry configured to determine a welding area, and determine, via the welding asset tracking database, one or more welding assets located in or near the welding area, wherein the communication circuitry is further configured to send a signal representative of the one or more welding assets. In some examples, the one or more welding assets comprise the particular welding asset. In some examples, the communication circuitry is further configured to receive a position signal representative of a position of a user device; wherein the processing circuitry is configured to determine the welding area by determining the welding area that is nearest to the position of the user device. In some examples, the processing circuitry is configured to use the welding asset tracking database to determine the welding area that is nearest to the position of the user device. In some examples, the welding asset tracking database comprises a data structure storing locations of one or more welding assets.

In some examples, the one or more welding assets comprise one or more of a wire feeder, welding power supply, operator badge, welding helmet, air-purifying respirator, welding wire spool, welding wire barrel, work order, workpiece, welding gun, grinder, fume extractor, foot pedal, gas bottle regulator, power supply pendant, welding cable, or sensor module. In some examples, the particular welding asset comprises a wire feeder or welding power supply. In some examples, the gateway is in direct or indirect communication with a hub or a second gateway retained by the particular welding asset. In some examples, the system further comprises a welding asset tracking database, wherein the communication circuitry is further configured to receive from a user device a position signal representative of a position of the user device, and a type signal representative of a selected type of welding asset, the processing circuitry configured to determine, using the welding asset tracking database, the particular welding asset of the selected type that is nearest the position of the user device.

FIG. 1 shows an example of a welding asset tracking system 100. As shown, the welding asset tracking system 100 includes an asset tracking server 110, a local positioning system comprising one or more location beacons 120, and an asset tracking network comprising several welding assets 200 interconnected via one or more gateways 140, hubs 160, and/or tags 180. As shown, the gateway(s) 140, hub(s) 160, and/or tag(s) 180 are retained by the one or more welding assets 200. In some examples, one or more brackets, fasteners, housings, and/or other mechanisms may be used to retain the gateway(s) 140, hub(s) 160, and/or tag(s) 180 in and/or on the welding assets 200. In some examples, one or more mobile devices 104 (e.g., smartphones, tablet computers, laptop computers, etc.) configured for use with the welding asset tracking system 100 may also take on the role of a gateway 140 or server 110. In some examples, one or more of the gateways 140, hubs 160, and/or tags 180 may not be retained by a welding asset 200.

Figure 2:
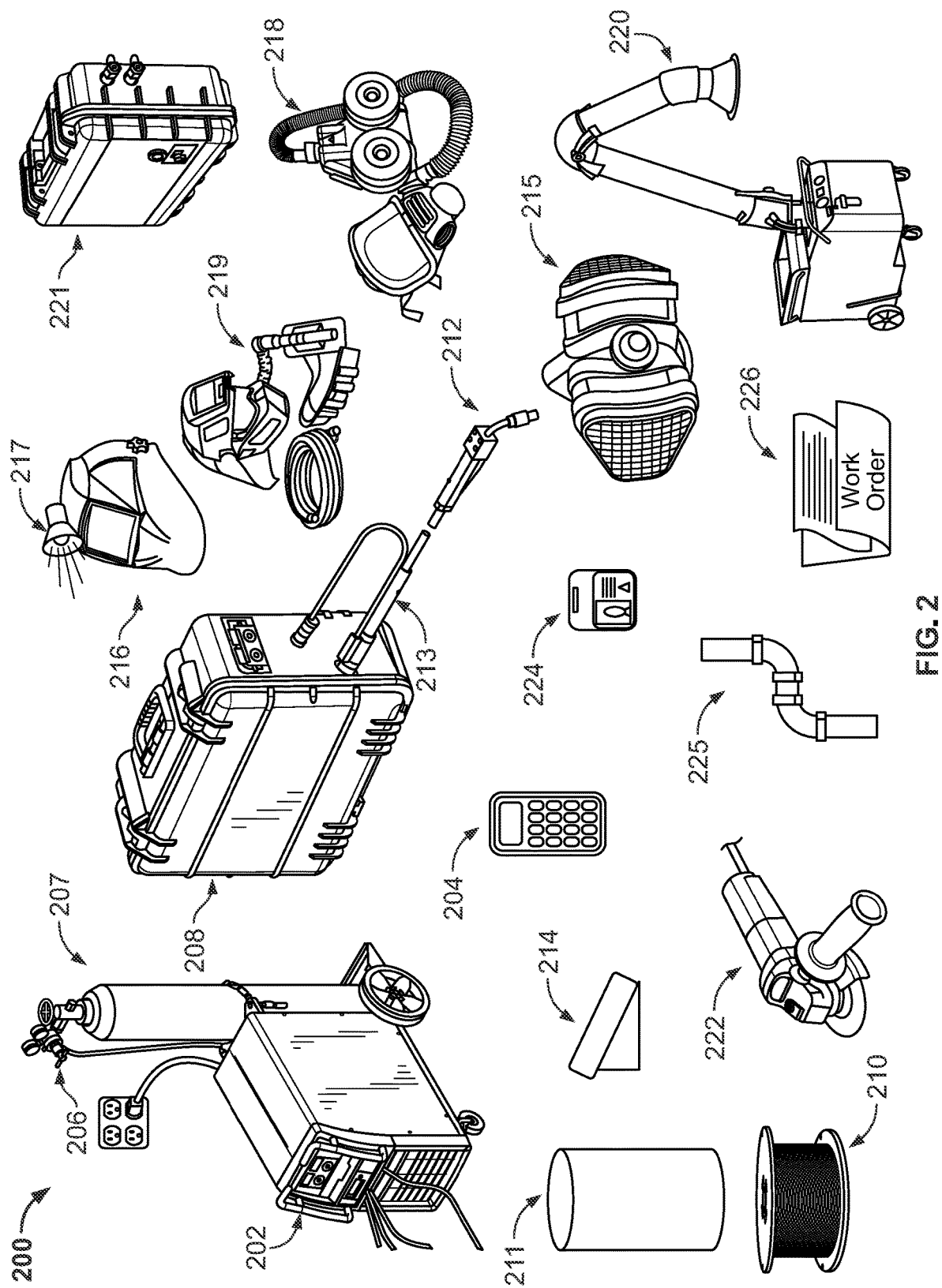
FIG. 2 shows examples of different welding assets that may be used with the welding asset tracking system of FIG. 1, in accordance with aspects of this disclosure.

A welding asset 200, as used herein, may refer to any device, equipment, accessory, and/or tool used for welding and/or welding-type activities (e.g., metal fabrication, induction heating, grinding, polishing, plasma cutting, etc.). FIG. 2 shows several common examples of welding assets 200 that may be used with the welding asset tracking system 100. As shown, common welding assets 200 may include a welding (and/or welding-type) power supply 202, a power supply pendant 204, a gas bottle regulator 206, a gas bottle 207, a welding wire feeder 208, a wire spool 210, a wire barrel 211, a welding torch 212, a foot pedal 214, a respirator mask 215, a welding helmet 216, a light 217 (e.g., attached to, or separate from, the welding helmet 216), a powered air-purifying respirator (PAPR) 218, a fume extractor 220 (e.g., to extract welding fumes), a supplied air respirator (SAR) 219, a grinder 222, a box filtration system 221, an operator id badge 224, welding material 225 (e.g., welding workpiece(s)), and a welding work order 226 (e.g., affixed to a bin or pallet containing welding material 225, or the welding material 225 itself). In some examples, the welding torch 212 may be a welding gun or plasma torch. In some examples, the welding torch 212 may be robot and/or machine operated.

In the example of FIG. 1, each welding asset 200 includes one or more sensors 106. In some examples, the one or more sensors 106 may be configured to continuously and/or periodically sense, detect, measure, and/or record sensor data relating to the operation(s) (and/or error(s)) of that particular welding asset 200. For example, a welding power supply 202 may have one or more sensors 106 configured to sense, detect, measure, and/or record an input, intermediate, and/or output current and/or voltage, an arc time, a cooling airflow amount, a cooling device (e.g., fan) on time, a weld start/stop time, and/or a total energy amount outputted. As another example, a wire feeder 208 may have one or more sensors 106 configured to sense, detect, measure, and/or record a wire feed speed, a motor current, motor voltage, a cooling airflow amount, a cooling device (e.g., fan) on time, roller torque, roller speed, and/or a total amount of filler material output. As another example, a gas regulator 206 may have one or more sensors 106 configured to sense, detect, measure, and/or record gas flow rate, gas temperature, gas mixture, and/or total gas output. As another example, a welding helmet 216 may have one or more sensors 106 configured to sense, detect, measure, and/or record temperature in and/or around the welding helmet 216, air quality in and/or around the welding helmet 216, motion of the welding helmet 216, an electromagnetic field (e.g., strength, direction, etc.) proximate the welding helmet 216, a light intensity proximate the welding helmet 216, whether the helmet 216 is in a darkened state (e.g., for auto-darkening helmets), and/or the total amount of time spent in the darkened state (and/or undarkened state). As another example, a welding torch 212 may have one or more sensors 106 configured to sense, detect, measure, and/or record trigger activation start/stop time, activation duration, arc time, position (e.g., with respect to welding material 225 and/or a fixture), orientation (e.g., with respect to welding material 225 and/or a fixture), motion (e.g., with respect to welding material 225 and/or a fixture), current, and/or voltage. As another example, a foot pedal 214 may have one or more sensors 106 configured to sense, detect, measure, and/or record pedal activation start/stop time, activation duration, and/or activation pressure. As another example, a pendant 204 may have one or more sensors 106 configured to sense, detect, measure, and/or record a recent command history. As another example, an operator badge 224 may have one or more sensors 106 configured to sense, detect, measure, and/or record a scanning history (e.g., where the badge is scanned when entering/exiting certain areas and/or using certain assets). As another example, a PAPR 218 or fume extractor 220 may have one or more sensors 106 configured to sense, detect, measure, and/or record air circulation amounts, air quality, air temperature, and/or a condition of a filter.

In some examples, the one or more sensors 106 may detect and/or record a time corresponding to the sensing, detection, measurement, and/or recording of the sensor data. In some examples, one or more of the welding assets 200 may have no sensor 106. In some examples, a stand-alone sensor 106 configured to be removably attached to some third party (e.g., competitor) welding asset may be considered a welding asset 200 in and of itself. For example, a Hall Effect sensor or magnetic reed switch sensor configured to be attached to a welding cable and/or detect current through the welding cable may be fitted with its own tag 180, effectively making the sensor 106 itself a welding asset 200. As another example, an air flow sensor configured to be attached to a welding power supply 202 (e.g., within the interior and/or in fluid communication with external vents) may be configured to detect cooling air circulating through the welding power supply 202 and fitted with its own tag 180, effectively making the sensor 106 itself a welding asset 200.

In the example of FIG. 1, each sensor 106 has an electrical and/or communication link to a tag 180, hub 160, and/or gateway 140 retained by a welding asset 200. Through this link, sensor data sensed, detected, measured, and/or recorded by the sensor may be communicated to the tag 180, hub 160, and/or gateway 140 retained by the welding asset 200. As shown, the tag 180, hub 160, and gateway 140 have tag memory circuitry 182, hub memory circuitry 162, and gateway memory circuitry 142, respectively, configured to store the sensor data. In some examples, the tag memory circuitry 182, hub memory circuitry 162, and/or gateway memory circuitry 142 may also store a time corresponding to the detection, measurement, recordation, and/or reception of the sensor data. In some examples, the tag memory circuitry 182, hub memory circuitry 162, and/or gateway memory circuitry 142 may also store some other data related to the welding asset 200. The tag memory circuitry 182, hub memory circuitry 162, and/or gateway memory circuitry 142 may also store an identifier (e.g., serial number) that is unique within the welding asset tracking system 100 and/or associated with the welding asset 200 retaining the tag 180, hub 160, or gateway 140 (and/or associated with the tag 180, hub 160, or gateway 140 itself).

In some examples, smaller and/or less sophisticated welding assets 200c (e.g., wire spools 210, work orders 226, welding material 225, operator badges 224, welding guns 212, grinders 222, welding helmets 216, etc.), and/or welding assets 200c that change location frequently, may retain tags 180. In some examples, the tags 180 may be relatively cheap and/or simple devices and/or mechanisms. In the example of FIG. 1, the tag 180 includes tag communication circuitry 184 and tag memory circuitry 182 in electrical communication with one another. As discussed above, the tag memory circuitry 182 may store sensor data, one or more identifiers, and/or other data related to the retaining welding asset 200c. The tag communication circuitry 184 may be configured for shorter range communication, such as, for example, via a short wavelength ultra-high frequency protocol (commonly referred to as Bluetooth), an IEEE 802.15.4 standard protocol (commonly referred to as Zigbee), a DigiMesh protocol, a Digi XBee protocol, a near field communication (NFC) protocol, and/or a radio frequency identification (RFID) protocol. In some examples, the tag communication circuitry 184 may communicate data (i.e., tag data) stored in the tag memory circuitry 182 via the tag communication circuitry 184.

In some examples, a tag 180 may be so simple as to have no circuitry. For example, a simple welding asset 200 (e.g., wire spool) with no sensor 106 may record no dynamic data and/or have no need of dynamically updatable memory circuitry. In such an example, a tag 180 may be implemented via a (e.g., linear and/or one dimensional) barcode 186 or matrix (and/or two dimensional) barcode 188. In some examples, the tag 180 (and/or barcode 186 or matrix barcode 188) may be retained on an outside of the welding asset 200a or within a housing, chassis, cover, etc. of the welding asset 200a.

In some examples, moderately sized and/or moderately sophisticated welding assets 200b (e.g., welding helmets 216, wire feeders 208, power supplies 202), and/or welding assets 200 that only change locations occasionally, may retain hubs 160. In some examples, the hubs 160 may be retained on an outside of welding assets 200b or within a housing, chassis, cover, etc. of the welding assets 200b. In some examples, the hub retaining welding assets 200b may have existing circuitry (e.g., memory, control, and/or communication circuitry) that can be supplemented relatively easily and/or cheaply to give the welding assets 200b capabilities of a hub 160.

In the example of FIG. 1, the hub retaining welding asset 200b includes an asset interface 102b linked to the hub 160. As shown, the asset interface 102b includes a plurality of input devices (e.g., buttons, knobs, dials, switches, microphones, etc.) and a plurality of output devices (e.g., a display screen and one or more lights, speakers, etc.). In some examples, the asset interface 102b may be configured to emit a perceptible output via one or more of its output devices, such as, for example, visibly blinking/flashing lights, visible display screen message/picture, audible siren, audible wailing, audible beeping, audible klaxon, and/or other visible and/or audible outputs. In some examples, the asset interface 102b may be configured to emit an imperceptible output via one or more of its output devices, such as, for example, one or more invisible lights and/or inaudible sounds emitted at a wavelength and/or frequency outside of the human perceptible range (e.g., ultraviolet light, infrared light, inaudible sound, ultrasonic sound, etc.). In some examples, the perceptible output(s) may be detected by, and/or used to attract the attention of, an operator and/or other individual. In some examples, the imperceptible output(s) may be detected by a mobile device 104 (and/or other device, such as, for example a welding helmet 216 and/or other welding asset 200) configured for detection of imperceptible output(s), and used by the mobile device 104 (and/or other device) to direct an operator and/or other individual towards the source of the imperceptible output(s).

In the example of FIG. 1, the hub 160 includes hub memory circuitry 162, hub control circuitry 166, and hub communication circuitry 164, in electrical communication with one another. In addition to identifiers and/or sensor data, the hub memory circuitry 162 is shown storing a hub tracking program 400 that guides the hub 160 in fulfilling its role in the welding asset tracking system 100, as discussed further below. The hub control circuitry 166 controls the operation of the hub 160 in accordance with the hub tracking program 400. In some examples, the hub control circuitry 166 may comprise one or more processors.

In the example of FIG. 1, the hub communication circuitry 164 includes short range hub communication circuitry 163. In some examples, the short range hub communication circuitry 163 may be configured for shorter range wireless communication, such as, for example, via a short wavelength ultra-high frequency protocol (commonly referred to as Bluetooth), an IEEE 802.15.4 standard protocol (commonly referred to as Zigbee), an NFC protocol, and/or an RFID protocol. In some examples, the hub 160 may obtain tag data from nearby tags 180 (and/or their tag communication circuitry 184 and/or tag memory circuitry 182) in communication range using the short range hub communication circuitry 163. In some examples, a hub 160 may be configured to only communicate with and/or obtain tag data from specific tags 180, specific welding assets 200, and/or specific types of welding assets 200 (e.g., based on identifier(s)).

In the example of FIG. 1, the hub 160 is linked to a barcode scanner 168 configured to obtain tag data from a barcode 186 and/or matrix barcode 188. In some examples, the hub 160 may use the barcode scanner 168 instead of, or in addition to, the short range hub communication circuitry 163 to obtain tag data. For example, a wire feeder 208 (comprising a welding asset 200b) may have a barcode scanner 168 positioned and/or configured to scan a barcode 186 or matrix barcode 188 imprinted on an outer portion of a wire spool 210 when the wire spool 210 is loaded into the wire feeder 208. In some examples, the hub 160 may store the tag data (as well as a corresponding time the tag data is sent and/or received) in hub memory circuitry 162.

In the example of FIG. 1, the hub communication circuitry 164 also includes long range hub communication circuitry 165. In some examples, the long range hub communication circuitry 165 may be configured for longer range wireless communications, such as, for example, via a cellular and/or IEEE 802.11 standard (commonly referred to as WiFi) protocol. As shown, the hub 160 may be in communication with one or more gateways 140 of the welding asset tracking system 100 via the long range hub communication circuitry 165. In some examples, the hub 160 may send tag data obtained from nearby tags 180 to one or more gateways 140 in communication with the hub 160 via the long range hub communication circuitry 165. In some examples, the hub 160 may additionally, or alternatively, send an identifier of the welding asset 200b (and/or hub 160), sensor data from the sensor 106b, and/or other data relating to the welding asset 200b to one or more gateways 140 in communication with the hub 160 via the long range hub communication circuitry 165. Collectively, this data may be referred to as hub data. In some examples, the hub 160 may send tag data and/or hub data directly to the asset tracking server 110 via the long range hub communication circuitry 165. In some examples, the hub 160 may send the tag data and/or hub data to a second hub 160 of the welding asset tracking system 100, such as, for example, if the hub communication circuitry 164 is unable to establish communication with a gateway 140 and/or the asset tracking server 110. In such an example, the second hub 160 may either be in communication with a gateway 140 (in which case tag data and/or hub data may be sent to the gateway 140) or also unable to establish communication with a gateway 140. If the second hub 160 is also unable to establish communication with a gateway 140, the tag data and/or hub data may be forwarded to a third hub 160 (and so on and so on until the data arrives at a hub 160 in communication with a gateway 140).

In the example of FIG. 1, the gateway 140 is retained by a welding asset 200a. In some examples, larger and/or more sophisticated welding assets 200a (e.g., wire feeders 208, power supplies 202, etc.), and/or welding assets 200a that rarely change location significantly, may retain gateways 140. In some examples, the gateways 140 may be more sophisticated and/or expensive devices. Nevertheless, in some examples, the welding assets 200a may have existing circuitry that can be supplemented relatively easily and/or cheaply to give the welding asset 200a gateway capabilities.

In the example of FIG. 1, the gateway retaining welding asset 200a includes an asset interface 102a linked to the gateway 140. As shown, the asset interface 102a includes a plurality of input devices (e.g., buttons, knobs, dials, switches, microphones, etc.) and a plurality of output devices (e.g., a display screen and one or more lights, speakers, etc.). In some examples, the asset interface 102a may be configured to emit a perceptible output via one or more of its output devices, such as, for example, visibly blinking/flashing lights, visible display screen message/picture, audible siren, audible wailing, audible beeping, audible klaxon, and/or other visible and/or audible outputs. In some examples, the asset interface 102a may be configured to emit an imperceptible output via one or more of its output devices, such as, for example, one or more invisible lights and/or inaudible sounds emitted at a wavelength and/or frequency outside of the human perceptible range (e.g., ultraviolet light, infrared light, inaudible sound, ultrasonic sound, etc.). In some examples, the perceptible output(s) may be detected by, and/or used to attract the attention of, an operator and/or other individual. In some examples, the imperceptible output(s) may be detected by a mobile device 104 (and/or other device) configured for detection of imperceptible output(s), and used by the mobile device 104 (and/or other device) to direct an operator and/or other individual towards the source of the imperceptible output(s).

In the example of FIG. 1, each gateway 140 includes gateway memory circuitry 142, gateway control circuitry 146, and gateway communication circuitry 144 in electrical communication with one another. In addition to identifiers and/or sensor data, the gateway memory circuitry 142 stores a gateway tracking program 401 that guides the gateway 140 in fulfilling its role in the welding asset tracking system 100, as discussed further below. The gateway control circuitry 146 controls the operation of the gateway 140 in accordance with the gateway tracking program 401. In some examples, the gateway control circuitry 146 may comprise one or more processors.

In the example of FIG. 1, the gateway communication circuitry 144 includes short range gateway communication circuitry 143. In some examples, the short range gateway communication circuitry 143 may be configured for shorter range wireless communication, such as, for example, via a short wavelength ultra-high frequency protocol (commonly referred to as Bluetooth), an IEEE 802.15.4 standard protocol (commonly referred to as Zigbee), an NFC protocol, and/or an RFID protocol. In some examples, the gateway 140 may obtain tag data from nearby tags 180 and/or hub data from nearby hubs 160 (in communication range using the short range gateway communication circuitry 143. Though not shown, in some examples, the gateway 140 may be linked to a barcode scanner 168 and obtain tag data from a barcode 186 and/or matrix barcode 188 using the barcode scanner 168. In some examples, the gateway 140 may store the tag data and/or hub data (as well as a corresponding time the tag/hub data is sent and/or received) in gateway memory circuitry 142.

In the example of FIG. 1, the gateway communication circuitry 144 also includes long range gateway communication circuitry 145. In some examples, the long range gateway communication circuitry 145 may be configured for longer range wireless communications, such as, for example, via a cellular and/or IEEE 802.11 standard (commonly referred to as WiFi) protocol. As shown, the gateway 140 may be in communication with one or more hubs 160 of the welding asset tracking system 100 via the long range gateway communication circuitry 145. In some examples, the gateway 140 may receive hub data (and/or asset identifiers, sensor data, timestamps, etc.) obtained from nearby hubs 160 via the long range gateway communication circuitry 145. In some examples, the gateway 140 may also communicate with other gateways 140 of the welding asset tracking system 100 via the gateway communication circuitry 144 (long and/or short range).

In the example of FIG. 1, the gateway 140 also includes global positioning system (GPS) communication circuitry 147. As shown, the gateway 140 is in communication with an external positioning system 108 (e.g., GPS, Wifi, and/or cellular positioning system). In some examples, the GPS communication circuitry 147 may enable communication with the external positioning system 108. In some examples, the external positioning system 108 may provide the gateway 140 with a position (e.g., latitude and/or longitude) of the gateway 140 and/or retaining welding asset 200*a* via the external positioning system 108 and/or GPS communication circuitry 147. In some examples, one or more hubs 160 may also have GPS communication circuitry 147 (and/or other appropriate communication circuitry) with which to communicate with, and/or obtain position information from, the external positioning system 108.

In the example of FIG. 1, the hubs 160 are in communication (e.g., via short range hub communication circuitry 163) with a local positioning system comprising one or more location beacons 120. In some examples, the gateways 140 may also be in communication (e.g., via short range gateway communication circuitry 143) with the local positioning system. In some examples, the local positioning system may be used to estimate and/or determine a (relative, local, and/or global) position of a gateway 140, hub 160, tag 180, and/or welding asset 200, such as, for example, in situations where the external positioning system 108 is unavailable, unreachable, and/or otherwise not an option. In some examples, multiple location beacons 120 may be positioned throughout a welding area to provide a dense, granular, and/or more precise local positioning system.

In the example of FIG. 1, the location beacon 120 of the local positioning system includes beacon memory circuitry 122, beacon communication circuitry 124, and a beacon user interface (UI) 126 in electrical communication with one another. As shown, the beacon memory circuitry 122 stores a location 128 of the beacon 120. This beacon location 128 may be a relative position (e.g., 100 feet NW of beacon 2, halfway between front door and western window, etc.), a local position (e.g., welding cell 5, back door, front wall, loading bay, etc.), and/or a global position (e.g., 41.8823° N, 87.6404° W). In some examples, the beacon location 128 may be entered and/or modified via the beacon UI 126. In some examples, the beacon location 128 may be entered and/or modified via a third party device (e.g., mobile device 104) in communication with the location beacon 120 (e.g., via beacon communication circuitry 124). In some examples, the beacon location 128 may be communicated to hubs 160 and/or gateways 140 in communication range via beacon communication circuitry 124.

In some examples, a maximum communication range of the beacon communication circuitry 124 may be reduced to a set communication range. This reduction may be achieved via beacon UI 126 and/or third party device in communication with the beacon communication circuitry 124, for example. In some examples, the maximum communication range and/or set communication range may be stored in the beacon memory circuitry 122, and/or accessed when determining position.

In some examples, the hubs 160 and/or gateways 140 of the welding asset tracking system 100 may determine their positions via the external positioning system 108 and/or local positioning system. For example, a gateway 140 in communication with the external positioning system 108 may determine its global position via GPS communication circuitry 147, and send this position to the asset tracking server(s) 110. Thereafter, the asset tracking server 110 (and/or the gateway 140 itself) may determine and/or estimate a position of any gateways 140, hubs 160, and/or tags 180 for which the gateway 140 has obtained (and/or communicated) data. As another example, a hub 160 that cannot access the external positioning system 108 may nonetheless access one or more location beacons 120 of the local positioning system and thereby estimate and/or determine its position based on the beacon locations 128 of the location beacons 120. Thereafter, the asset tracking server 110 (and/or hub 160 itself or some gateway 140) may determine and/or estimate a position of any hubs 160 and/or tags 180 for which the hub 160 has obtained (and/or communicated) data.

In some examples, the determination and/or estimation of position may include a position radius and/or a zone of uncertainty (e.g., position within 50 meters of gateway 12, or somewhere within facility 13). In some examples, the position determination and/or estimation may be made more accurate and/or precise by using multiple location beacons 120 in combination with trilateration and/or triangulation methods. In some examples, the position determination and/or estimation may be made more accurate and/or precise by using other factors (e.g., the communication range, signal strength, signal time of flight, signal direction, etc.). In some examples, the gateway(s) 140 and/or hub(s) 160 may be configured with a plurality of antennas (e.g., 2, 3, 4, etc.) to facilitate detection of signal direction (e.g., by determining which antenna(s) first receive the signal). In some examples, the position information of the external positioning system 108 and local positioning system may be combine to more accurately and/or precisely determine position.

In some examples, one or more gateways 140, hubs 160, tags 180, and/or sensors 106 may have their position stored in their own respective memory circuitry, so that position may be determined without resorting to an external positioning system. In some examples, the gateways 140, hubs 160, tags 180, and/or sensors 106 may also be setup, updated, paired, and/or otherwise configured with position information (and/or other information) via a third party device (e.g., mobile device 104) in communication with the gateway 140, hub 160, tag 180, and/or sensor 106. In some examples, the gateways 140, hubs 160, tags 180, and/or sensors 106 retained by welding assets 200 may be setup, paired, and/or otherwise configured via an interface of the retaining welding asset 200.

In the example of FIG. 1, the gateway 140 is also in communication with one or more asset tracking server(s) 110 through a network 101 (e.g., local area network, wide area network, internet, etc.). In some examples, the gateway 140 may be in communication with the asset tracking server(s) 110 directly, without going through the network 101. In some examples, the gateway communication circuitry 144 (e.g., the long range gateway communication circuitry 145) may be configured to facilitate communication with the asset tracking server(s) 110 and/or network 101. In some examples, the asset tracking server(s) 110 may be implemented in one or more gateways 140 and/or mobile devices 104.

In some examples, the gateways 140 may send information obtained from other gateways 140, hubs 160, and/or tags 180 to the asset tracking server(s) 110. In some examples, one or more hubs 160 may also be in communication with the asset tracking server(s) 110, and/or send information obtained from other hubs 160, and/or tags 180 to the asset tracking server(s) 110 without going through the gateway(s) 140. In some examples, one or more mobile devices 104 configured for use with the welding asset tracking system 100 may also take on the role of gateways 140 and send information obtained from other gateways 140, hubs 160, and/or tags 180 to the asset tracking server(s) 110. For example, one or more welding operators, administrators, maintenance workers, technicians, etc. may carry mobile devices 104 configured to act as mobile gateways 140 with the welding asset tracking system 100. In such an example, the mobile gateways 140 may obtain location, hub, and/or tag data (and/or gateway data) when in proximity to location beacons 120, gateways 140, hubs 160, and/or tags, and send the data to the asset tracking server(s) 110.

In the example of FIG. 1, the one or more asset tracking servers 110 include server communication circuitry 114, server processing circuitry 116, and server memory circuitry 112 in electrical communication with one another. In some examples, only one asset tracking server 110 may be used. In some examples, multiple asset tracking servers 110 may be used. As shown, the one or more asset tracking servers 110 are in communication with one or more gateways 140 through the network 101. In some examples, the asset tracking server(s) 110 may be in communication with one or more hubs 160 as well. In some examples, the asset tracking server(s) 110 may be in communication with the one or more gateways 140 and/or hubs 160 directly, without going through the network 101. In some examples, the server communication circuitry 114 may facilitate communication with the network 101, gateways 140, and/or hubs 160.

In the example of FIG. 1, the server memory circuitry 112 stores an asset tracking database 118 and an asset identification program 500. In some examples, the asset tracking database 118 may store data obtained from the gateways 140, hubs 160, tags 180, and/or sensors 106 of the welding asset tracking system 100. In some examples, certain data may be associated in the asset tracking database 118 to facilitate reporting, analysis, and/or tracking. For example, sensor data obtained from multiple sensors 106 of the same welding asset 200 may be linked and/or associated. As another example, data pertaining to the same welding assets, or welding assets of the same or similar type, at the same or similar location, used by the same or similar operators, and/or involved the same or similar operations, may be linked and/or associated. In some examples, the asset tracking database 118 may be stored in the server memory circuitry 112 of one asset tracking server 110. In some examples, duplicates of the asset tracking database 118 may be stored across several asset tracking servers 110. In some examples, different portions of the asset tracking database 118 may be stored in several different asset tracking servers 110.

In some examples, the server(s) 110 (e.g., via processing circuitry 116) may organize and/or store data received via the asset tracking network in the asset tracking database 118. In some examples, the server(s) 110 may further query and/or parse the data in the asset tracking database 118, such as in response to one or more user requests (e.g., received from a terminal, mobile device 104, and/or other device in communication with the asset tracking server(s) 110). For example, the asset tracking server 110 may receive one or more requests to locate a particular welding asset 200, a particular welding asset type, welding assets 200 in a particular location, welding assets 200 performing a particular operation, welding assets 500 used by a particular operator, etc. In response, the asset tracking server 110 may query and/or parse the data in asset tracking database 118 to respond to the request.

In the example of FIG. 1, the server memory circuitry 112 further stores an asset identification program 500. In some examples, the asset identification program 500 may comprise computer (and/or processor) readable (and/or executable) instructions. In some examples, the server processing circuitry 116 may control the operation of the asset tracking server 110 in accordance with the asset identification program 500. In some examples, the server processing circuitry 116 may comprise one or more processors.

In some examples, the asset identification program 500 may direct the server communications circuitry 114 to send one or more alarm signals to one or more selected welding asset(s) 200. In some examples, the alarm signal(s) may be representative of a command for the one or more selected welding asset(s) 200 to emit a perceptible (and/or imperceptible) output via the asset interface 102. In some examples, the alarm signal(s) may include one or more identifiers corresponding to the one or more welding assets 200 (and/or their retained tag(s) 180, hub(s) 160, and/or gateway(s) 140).

In some examples, the alarm signal(s) may be sent via the asset tracking network. For example, when the asset identification program 500 seeks to identify a particular (e.g., selected) welding asset 200 to an operator, the server communication circuitry 114 may send an alarm signal to a hub 160 or gateway 140 retained by the particular welding asset 200 via the asset tracking network (e.g., one or more intervening hubs 160 and/or gateways 140). In some examples, the alarm signal may be transmitted to a particular intervening gateway 140 or hub 160 based on the particular welding asset 200. For example, the asset tracking database 118 may link (e.g., via one or more tables, unique identifiers, etc.) the particular welding asset 200 to a particular gateway 140 or hub 160 (e.g., closest gateway 140 or hub 160 in communication with asset tracking server(s) 110 or gateway 140 or hub 160 that most recently sent data pertaining to particular welding asset 200).

In some examples, when a hub 160 or gateway 180 of the particular welding asset 200 receives the alarm signal, the alarm signal, or the command represented by the alarm signal, may be communicated to the asset interface 102 of the particular welding asset 200. The asset interface 102 may thereafter emit an output in response to the signal and/or command. The output may be used by an operator to physically locate the welding asset 200. For example the asset interface 102 may emit a visible output (e.g., a flashing light) which an operator may see. If an operator sees the visible output, the operator can locate and identify the particular welding asset 200. As another example, the asset interface 102 may emit an audible output, which the operator may perceive in order to physically locate and/or identify the particular welding asset 200.

In some examples, the output may be imperceptible, inaudible, and/or invisible to humans (e.g., infrared light and/or ultrasonic sound) and yet nonetheless detectable by a mobile device 104 (and/or other device) particularly configured for such detection. In some examples, the imperceptible output may be a radio frequency (RF) signal emitted by the hub 160 or gateway 180 (e.g., with a special signal frequency, output frequency, payload, etc.) rather than the asset interface 102. In such examples, an operator using the mobile device 104 may still be able to physically locate and identify the welding asset 200 from the imperceptible emitted output.

Figure 3:
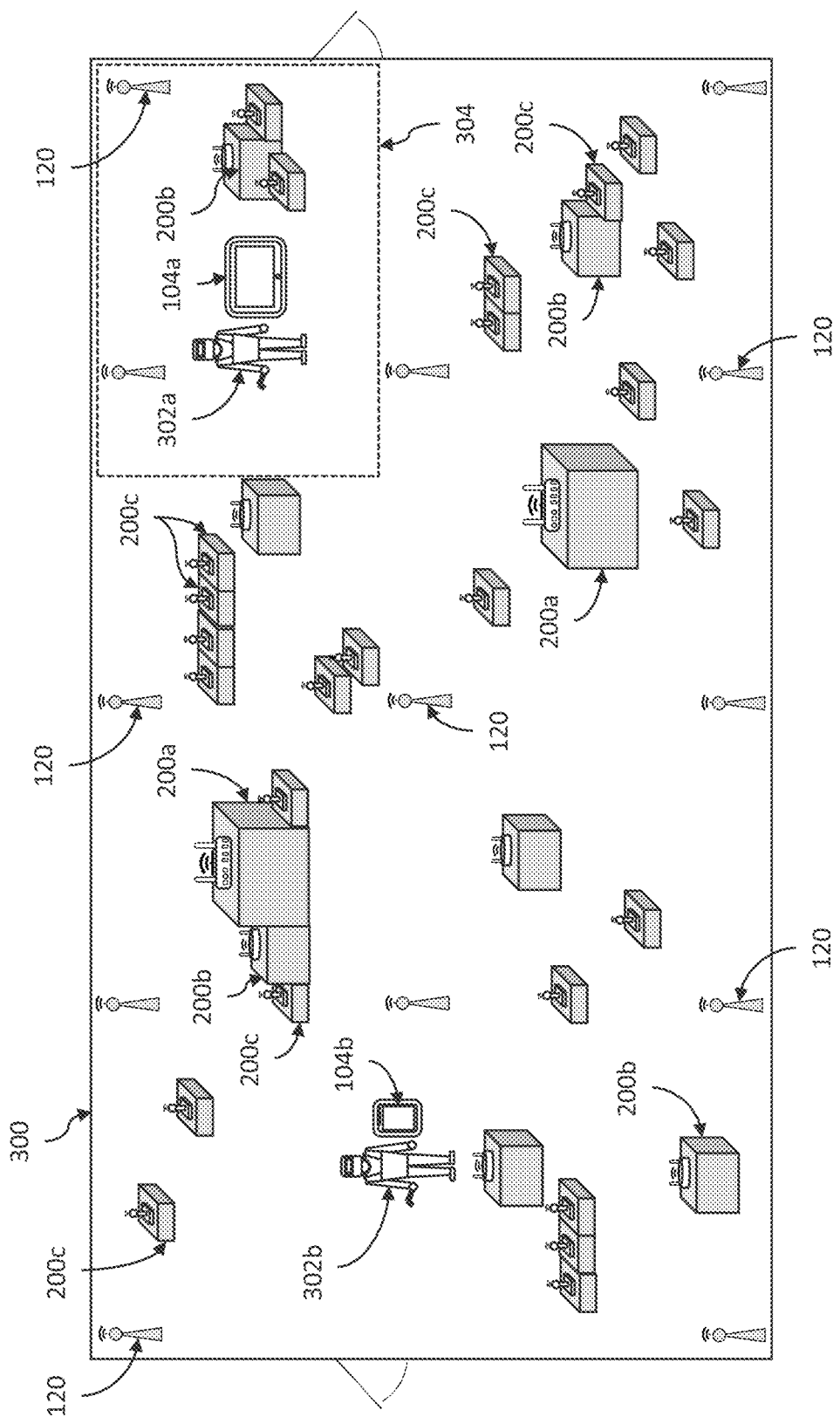
FIG. 3 is a diagram illustrating an example welding area with components of the welding asset tracking system of FIG. 1, in accordance with aspects of this disclosure.

FIG. 3 is a diagram illustrating components of the welding asset tracking system 100 distributed within an example welding area 300. As shown, several gateway retaining welding assets 200a, hub retaining welding assets 200b, and tag retaining welding assets 200c are positioned throughout the welding area 300. A plurality of location beacons 120 are also arranged in a grid like configuration within the welding area 300. In some examples, the grid like configuration may increase the likelihood that there will be at least one location beacon 120 nearby that can be used to determine position. Two welding operators 302 with mobile devices 104 that may operate as gateways 140 are also shown in the welding area 300.

In the example of FIG. 3, there are more tag retaining welding assets 200c than hub retaining welding assets 200b, and more hub retaining welding assets 200b than gateway retaining welding assets 200a. This may reflect a real world situation, and may help illustrate the economics of the welding asset tracking system 100. Using low cost tags 180 with the numerous tag retaining welding assets 200c may help to keep costs manageable. The fewer hub retaining welding assets 200b and gateway retaining welding assets 200a means that fewer pricey hubs 160 are used, and still fewer even pricier gateways 140.

Despite being fewer in number than the tag retaining welding assets 200c (and/or tags 180), the hub retaining welding assets 200b and gateway retaining welding assets 200a (and/or associated hubs 160 and gateways 140) nevertheless form a relatively dense asset tracking network. The majority of tag retaining welding assets 200c (and/or tags 180) are within close proximity to at least one hub retaining welding asset 200b or gateway retaining welding asset 200a. As shown, all the hub retaining welding assets 200b are in proximity to at least one hub retaining welding asset 200b or gateway retaining welding asset 200a. In examples where no gateway 140 is in proximity, a hub 160 may send its data to another hub 160 in proximity, and so on and so forth, until the data arrives at a gateway 140 (or a mobile device 104 or hub 160 with gateway capabilities). The density of the hubs 160 and gateways 140, as well as the mesh like network forwarding capabilities of the hubs 160, may help ensure that data can be relatively consistently collected and/or uploaded to the asset tracking server 110. Further, this density may be representative of real world situations, where often times multiple welding assets 200 are used in relatively close proximity to one another, and rarely is a welding asset 200 left isolated far from other welding assets 200. While the mobile devices 104 operating as gateways 140 may be valuable supplements, such as in those cases where one or more welding assets 200 are isolated, they are not a necessity. Thus, the system can still operate well even if operators 302 with mobile devices 104 are only rarely (or never) in the welding area 300.

In the example of FIG. 3, an operator 302a using a mobile device 104a may desire to locate one or more welding assets 200 (e.g., within a certain vicinity 304 of the operator 302a). In some examples, the mobile device 104a may run an application that communicates with the welding asset server(s) 110 to present various selectable welding assets 200 (and/or types of welding assets 200). In some examples, the presented welding assets 200 may be filtered based on one or more criteria (e.g., time, location, frequency of selection, maintenance and/or welding schedules, etc.).

Using mobile device 104a and/or the application running on the mobile device 104a, the operator 302a may select to locate one or more particular welding assets 200 from the presented welding assets 200. In some examples, to select a particular welding asset 200, the operator 302a may input an identifier (e.g., serial number) and/or select an image (e.g., in a list or on a map) that corresponds to a particular welding asset 200 to make the selection. Upon selection, the mobile device 104a may then send one or more corresponding selection signals representative of the selection to the asset tracking server 110. The asset tracking server 110 may then send an alarm signal to the selected assets(s) 200.

Upon receiving the alarm signal, the asset interface(s) 102 of the selected welding asset(s) 200 may emit one or more outputs, which may allow the operator 302a to physically locate and identify the welding asset(s) 200. In some examples, the outputs may be perceptible to the operator 302a (e.g., a light or sound). In some examples, the outputs may be received by the mobile device 104a and/or used to determine the location of the welding asset 200 and/or direct the operator 302a to the location of the welding asset 200.

Figure 4A:
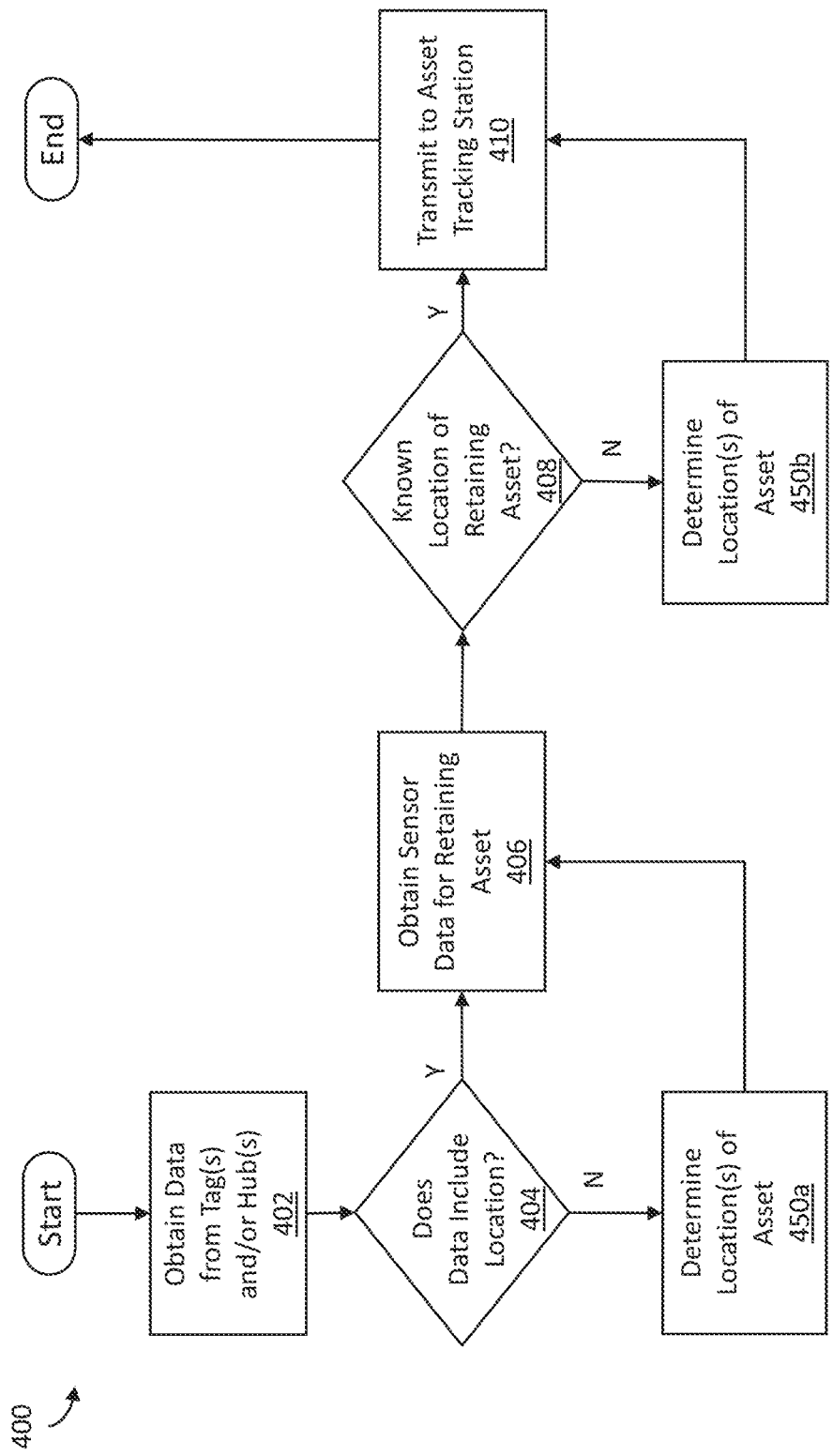
FIGS. 4a and 4b are flowcharts illustrating an example hub tracking program of the welding asset tracking system of FIG. 1, in accordance with aspects of this disclosure.

FIG. 4a is a flowchart illustrating an example hub tracking program 400 of the welding asset tracking system 100 of FIG. 1. In some examples, the hub tracking program 400 may be implemented in computer (and/or processor) readable (and/or executable) instructions. While shown as being stored in hub memory circuitry 162, in some examples, the hub tracking program 400 may be implemented in discrete analog and/or digital circuitry. While FIG. 4a is described in terms of the hub tracking program 400, in some examples, the gateway tracking program 401 may operate very similarly to the hub tracking program 400 (e.g., with respect to a gateway 140 and/or gateway retaining welding asset 200a instead of hub 160 and/or hub retaining welding asset 200b). In some examples, portions of the hub tracking program 400 may also be performed by the asset tracking server(s) 110.

In the example of FIG. 4a, the hub tracking program 400 begins at block 402. At block 402, the hub tracking program 400 obtains data from one or more tags 180 and/or hubs 160 in communication range. In some examples, this may comprise reading one or more barcodes 186 and/or matrix barcodes 188 via a barcode scanner 168, communicating with tag communication circuitry 184 via the hub communication circuitry 164, and/or communications between hub communication circuitry 164. In some examples, the tag data obtained from the tags 180 may include sensor data read from one or more sensors 106c of the tag retaining welding asset(s) 200c, one or more identifiers, location data of the welding asset(s) 200c, and/or other data pertaining to the tag(s) 180 and/or welding asset(s) 200c. In some examples, hub data obtained from other hubs 160 may include sensor data read from one or more sensors 106b of the hub retaining welding asset(s) 200b, one or more identifiers, location data of the hub retaining welding asset(s) 200b, tag data obtained by the one or more hubs 160, and/or other data pertaining to the hub(s) 160 and/or welding asset(s) 200b. In some examples, the hub tracking program 400 may only obtain data from, and/or transmit data to, certain (e.g., authorized, paired, grouped, etc.) gateways 140, hubs 160, and/or tags 180.

In the example of FIG. 4a, the hub tracking program proceeds to block 404 after block 402. At block 404, the hub tracking program 400 determines whether the data received at block 402 includes location data for the various tags 180, hubs 160, and/or welding assets 200. In some examples, this determination may comprise parsing the tag data and/or hub data received at block 402. In some examples, this determination may instead be performed at the asset tracking server(s) 110.

In the example of FIG. 4*a*, the hub tracking program proceeds to block 450 if there is some missing location data. At block 450, the hub tracking program 400 determines the location of the one or more tag retaining welding assets 200*c*, tags 180, hub retaining welding assets 200*b*, and/or hubs 160 from which data was received at block 402. Block 450 is described in more detail below with respect to FIG. 4*b*. As shown, the hub tracking program 400 proceeds to block 406 if the data received at block 402 is not missing location data, and/or after completion of block 450.

In the example of FIG. 4*a*, the hub tracking program 400 obtains sensor data from the sensor 106*b* of the hub retaining asset 200*b* at block 406. After block 406, the hub tracking program 400 proceeds to block 408. At block 408, the hub tracking program 400 determines whether the location of the hub retaining asset 200*b* (and/or hub 160) is known. In some examples, this determination may comprise checking the hub memory circuitry 162 to see if a location is stored, checking the hub memory circuitry 162 to see if the asset tracking server 110 knows (and/or stores) the location of the hub retaining asset 200*b* (and/or hub 160), and/or checking whether block 450*a* was executed, as execution of block 450*a* may involve determining the location of the hub retaining asset 200*b* (and/or hub 160).

In the example of FIG. 4*a*, the hub tracking program 400 proceeds to block 450*b* if the location of the hub retaining welding asset 200*b* is not known. Block 450*b* is described in detail below with respect to FIG. 4*b*. In some examples, the determination at blocks 408 and 450*b* may only occur periodically (e.g., once per predetermined, programmatically determined, or otherwise set time period), rather than every time data is sent to the asset tracking server(s) 110 (and/or gateway(s) 140). In the example of FIG. 4*a*, if the location of the hub retaining welding asset 200*b* (and/or hub 160) is known, the hub tracking program 400 proceeds to block 410 where the hub tracking program 400 sends the sensor data and any other data (e.g., tag data, hub data, location data, identifiers) to the asset tracking server 110. In some examples, the data may be sent to the asset tracking server 110 through one or more intervening hubs 160 and/or gateways 140. After block 410, the hub tracking program 400 ends.

Figure 4B:
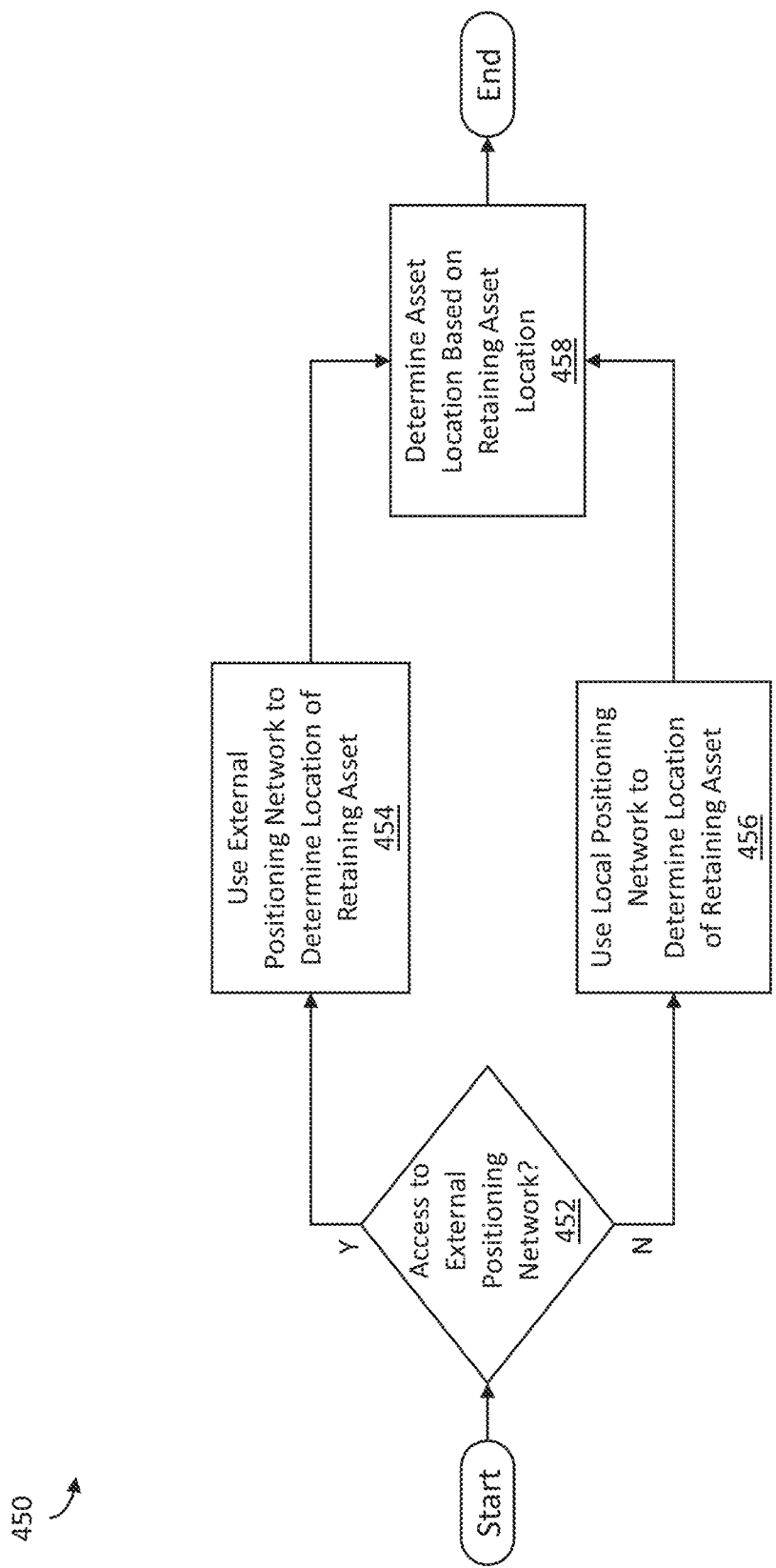

FIG. 4*b* is a flowchart illustrating asset location(s) blocks 450*a* and 450*b* of the hub tracking program 400 of FIG. 4*a* in more detail. As shown, the determine asset location(s) block 450 begins at block 452, where the hub tracking program 400 determines whether the hub communication circuitry 164 is configured to access an external positioning system 108 (e.g., GPS, Wifi, and/or cellular positioning system). If so, the hub tracking program 400 proceeds to block 454 where the position of the hub retaining welding asset 200*b* (and/or hub 160) is determined via communication with the external positioning system 108. In some examples, the determined position may comprise an approximate position with a radius of uncertainty (e.g., position is within 30 m radius of given latitude/longitude). In some examples, the hub tracking program 400 may also use the local positioning system at block 456 (e.g., to more precisely determine the location).

If the hub tracking program 400 determines the hub communication circuitry is not configured to access an external positioning system 108, the hub tracking program 400 proceeds to block 456. At block 456, the hub tracking program 400 uses the local positioning system to determine a location of the hub retaining welding asset 200*b* (and/or hub 160). In some examples, this may comprise communicating (e.g., via hub communication circuitry 164) with one or more location beacons 120 in communication range of the hub 160 to obtain the one or more beacon locations 128 corresponding to the one or more location beacons 120. In some examples, the hub tracking program 400 may determine a location of the hub retaining welding asset 200*b* using the one or more location beacons 120. In some examples, the determined location may comprise an approximate location with a degree of uncertainty (e.g., position is within 30 m radius of given latitude/longitude, position is somewhere within welding cell 10, etc.). In some examples, the degree of uncertainty may be based at least partially on the communication range of the beacon communication circuitry 124 and/or hub communication circuitry 164 (e.g., hub 160 within communication range of beacon location 128). In examples, where more than one location beacons 120 and/or beacon locations 128 are used, the hub tracking program 400 may use trilateration and/or triangulation methods to make the location more precise.

In the example of FIG. 4*b*, the hub tracking program 400 proceeds to block 458 after block 454 and/or block 456. At block 458, the hub tracking program 400 determines one or more other locations of one or more other welding assets 200. In some examples, the hub tracking program 400 may determine the other locations of the one or more other welding assets 200 based on the determined location of the hub retaining welding asset 200. For example, the hub tracking program 400 may consider the communication range of the tag communication circuitry 184 with which the hub communication circuitry 164 has communicated (and/or the hub communication circuitry 164), and determine that the corresponding tag 180 and/or tag retaining welding asset 200*c* must be within communication range of the location of the hub 160. As another example, the hub tracking program 400 may determine that the tag data was obtained via the barcode scanner 168, and determine that the corresponding tag 180 and/or tag retaining welding asset 200*c* must be within a scanning of the barcode scanner 168. In some examples, the hub tracking program 400 may send the determined location(s) (and/or time(s) of the determination(s)) to the welding asset(s) 200 (and/or retained tag(s) 180, hub(s) 160, and/or gateway(s) 140) for storage in memory circuitry, and/or store the location(s) in the hub memory circuitry 162.

In some examples, block 458 may be performed by the asset tracking server(s) 110 rather than the hub tracking program 400. For example, hubs 160 and/or gateways 140 may periodically determine their own locations and send to the asset tracking server 110 (along with their identifier(s)). Thereafter, the asset tracking server(s) 110 may determine which hub 160 and/or gateway 140 obtained which tag data (and/or hub data) and use the last received location of the hub and/or gateway 140 to determine the location of the tag retaining welding asset 200*c* corresponding to the tag data (and/or hub retaining welding asset 200*b* corresponding to the hub data). In some examples, (e.g., at block 450*b* of FIG. 4*a*), block 458 may be skipped altogether. In the example of FIG. 4*b*, the determine asset location(s) block 450 of the hub tracking program 400 ends after block 458.

By having welding assets 200 retain the gateways 140, hubs 160, and/or tags 160, the disclosed welding asset tracking system 100 becomes more likely to have the density necessary for more granular tracking due to the tendency of welding assets 200 being positioned near other welding assets 200. Additionally, using devices with varying sophistication levels and/or costs allows the welding asset tracking system 100 to be implemented economically, and according to the sophistication levels, costs, and/or portability of the various welding assets 200. Further, the inclusion of a local positioning system allows the welding asset tracking system 100 to operate even where an external positioning system 108 is unavailable (which may sometimes be the case in certain welding areas). In this way, the welding asset tracking server may continually receive updated information regarding each welding assets identity, location, and/or use. This updated information may be used by a welding asset manager to locate welding assets, allocate assets to different welding jobs, as well as determine whether assets should be brought in for maintenance and/or whether new assets should be acquired.

Figure 5:
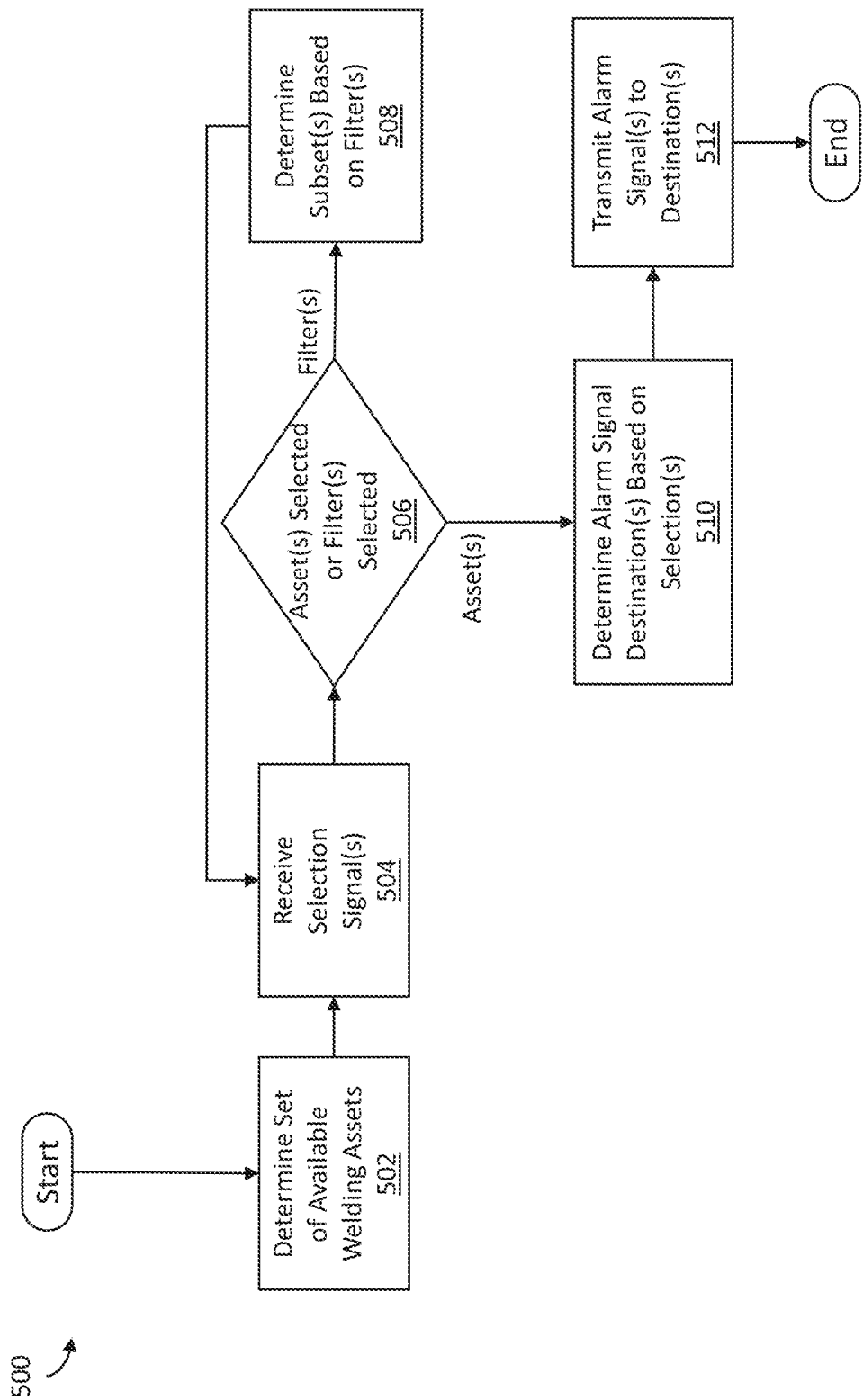
FIG. 5 is a flowchart illustrating an example asset identification program of the welding asset tracking system of FIG. 1, in accordance with aspects of this disclosure.

FIG. 5 is a flowchart illustrating an example asset identification program 500 of the welding asset tracking system 100 of FIG. 1. In some examples, the asset identification program 500 may be implemented in computer (and/or processor) readable (and/or executable) instructions. While shown as being stored in asset tracking server memory circuitry 112, in some examples, the asset identification program 500 may be implemented in discrete analog and/or digital circuitry.

In the example of FIG. 5, the asset identification program 500 begins at block 502. At block 502, the asset identification program 500 determines a set of available welding assets 200 using the data stored in the asset tracking database 118. In some examples, this determination may comprise determining which welding assets 200 have associated data stored in the database 118. In some examples, this determination may comprise determining which welding assets 200 that have associated data stored in the database 118 have an asset interface 102. In some examples, the determination may comprise determining which welding assets 200 are located in or near a welding area 300. In some examples, the determination may comprise determining which welding assets 200 a particular (e.g., logged in) user is authorized to access. In some examples, the asset identification program 500 may send the determined set of available welding assets 200 to a user device in communication with the asset tracking server(s) 110 (e.g., a mobile device 104, computer, terminal, etc.).

In the example of FIG. 5, the asset identification program 500 proceeds to block 504 after block 502. At block 504, the asset tracking server 110 receives, via the communications circuitry 114, one or more selection signals. In some examples, the selection signal(s) may be received from a mobile device 104, computer, terminal, and/or other user device in communication with the asset tracking server(s) 110. In some examples, the selection signal(s) may be representative of a selection of one or more particular welding assets 200 of the set of available welding assets 200. For example, the selection signal(s) may be representative of one or more identifiers corresponding to one or more particular welding assets 200, one or more hubs 160 retained by one or more particular hub retaining welding assets 200b, and/or one or more gateways 140 retained by one or more particular gateway retaining welding assets 200a.

In some examples, the selection signal(s) received at block 504 may be representative of a command to apply one or more filters to the set of available welding assets 200. For example, selection signal(s) may be representative of a command to filter the set of available welding assets 200 based on time (e.g., to show the most recently selected welding assets 200). As another example, the selection signal(s) may be representative of a command to filter the set of available welding assets 200 based on frequency of selection (e.g., to show the most commonly selected welding assets 200). As another example, the selection signal(s) may be representative of a command to filter the set of available welding assets 200 based on one or more maintenance schedules and/or welding schedules (e.g., to show which welding asset(s) 200 are scheduled to receive maintenance, are currently welding, have most recently received maintenance, most recently performed any and/or one or more particular welding operations, gone the longest without receiving maintenance, gone the longest without performing any welding operations, gone the longest without performing one or more particular welding operations, etc.). As another example, the selection signal(s) may be representative of a command to filter the set of available welding assets 200 based on a location (e.g., within some threshold distance of the user's device or some other location, within a particular welding area 300 and/or vicinity 304, within the closest welding area 300 and/or vicinity 304, etc.). As another example, the selection signal(s) may be representative of a command to filter the set of available welding assets 200 based on one or more types of welding assets 200 (e.g., power supplies 202, wire feeders 208, welding helmets 216, hub retaining welding assets 200b, asset retaining welding assets 200a, TIG torches, MIG torches, etc.). In examples where the filter is based on location, the selection signal(s) may be representative of a location of the device sending the selection signal(s).

In the example of FIG. 5, the asset identification program 500 proceeds to block 506 after block 504. At block 506, the asset identification program 500 determines whether the one or more selection signals are representative of one or more welding assets 200 or one or more filters. If the asset identification program 500 determines the one or more selection signals are representative of one or more welding assets 200 the asset identification program 500 proceeds to block 510, discussed further below. If the asset identification program 500 determines the one or more selection signals are representative of one or more filters, the asset identification program 500 proceeds to block 508.

In the example of FIG. 5, the asset identification program 500 determines a new set (and/or subset) of available welding assets 200 based on the selection signal(s) received at block 504 and/or the data stored in the asset tracking database 118. For example, the asset identification program 500 may filter the previous set of available welding assets 200 based on time, frequency, location, maintenance schedules and/or welding schedules, etc., as discussed above. In some examples, this determination and/or filtering may involve one or more queries of the asset tracking database 118. In some examples, the asset identification program 500 may send one or more signals representative of the new set (and/or subset) of available welding assets 200 to the user device that sent the selection signal(s) at block 504. As shown, the asset identification program returns to block 504 after block 508.

In some examples, the asset identification program 500 may repeatedly iterate through blocks 504-506 to allow a user to select one or more filters before making an asset 200 selection. In some examples, once one or more particular welding assets 200 are selected, the asset identification program 500 will determine at block 506 that the one or more selection signals are representative of one or more selections of one or more particular welding assets 200. In some examples, the determination at block 508 may include an automatic selection of one or more particular welding assets 200 (e.g., where the one or more selection signals previously received at block 504 represent of a command to automatically select the closest welding asset 200 of a particular type). As shown, the asset identification program 500 proceeds to block 510 when the asset identification program 500 determines that the one or more selection signals are representative of one or more selections of one or more particular welding assets 200.

In the example of FIG. 5, the asset identification program 500 determines one or more destination welding assets 200, hubs 160, and/or gateways 140 for one or more alarm signals at block 510. In some examples, the one or more destination welding assets 200, hubs 160, and/or gateways 140 may be determined based on one or more queries of the asset tracking database 118. For example, the asset tracking database 118 may comprise data correlating one or more hubs 160 and/or gateways 140 to one or more welding assets 200. In such an example, the asset identification program 500 may determine the one or more destinations based on the correlations in the database 118 and the selection(s) represented by the selection signal(s). As another example, the database 118 may not know which particular welding asset(s) retain which hub(s) 160 and/or gateway(s) 140. In such an example, the asset identification program 500 may format the alarm signal to include an identifier of the particular welding asset(s) 200, relying on the receiving hub(s) 160 and/or gateway(s) 140 to recognize their retaining welding asset 200.

In some examples, the asset identification program 500 may determine one or more communication paths through the asset tracking network by which to communicate with the destination asset(s) 200, hubs 160, and/or gateways 140. In some examples, this determination may include determining which communication path would be best, fastest, ideal, etc. In some examples, this determination may involve querying the asset tracking database 118. For example, the database 118 may include data on which hub(s) 160 and/or gateway(s) 140 most recently sent data to the asset tracking server(s) 110 corresponding to the destination asset(s) 200, hub(s) 160, and/or gateway(s) 140.

In the example of FIG. 5, the asset identification program 500 proceeds to block 512 after block 510. At block 512, the server communication circuitry 114 transmits the alarm signal(s) to the determined destination(s) and/or along the determined communication path(s). In some examples, the alarm signal(s) may be representative of one or more commands for the destination welding asset 200 (and/or retaining welding asset 200) to emit an output (e.g., perceptible and/or imperceptible) via its asset interface 102. In some examples, when the one or more destination welding assets 200 receive the alarm signal(s), the asset interface(s) 102 will emit an output that an operator can use to physically identify and/or locate the particular welding asset(s) 200.

The identification capabilities of the welding asset tracking system 100 disclosed herein allows for an operator 302 to quickly and/or easily locate and/or identify a particular welding asset 200 in a welding area 300 that may contain numerous similar welding assets 200. By emitting an output via an asset interface 102 of the welding asset 200, an operator 302 may be alerted to the physical location of the particular welding asset 200. The disclosure contemplates using existing asset interfaces 102 to emit the output, rather than having to include output devices in the gateway(s) 140 and/or hub(s) 160 of the system, thereby keeping the system efficient and economical. Likewise, the system 100 maximizes efficiencies by using the asset tracking network to both keep track of the locations of the welding assets 200 and send the alarm signal to identify the welding asset 200.

The present method and/or system may be realized in hardware, software, or a combination of hardware and software. The present methods and/or systems may be realized in a centralized fashion in at least one computing system, or in a distributed fashion where different elements are spread across several interconnected computing or cloud systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the terms "e.g.," and "for example" set off lists of one or more non-limiting examples, instances, or illustrations.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC), a graphic processing unit (GPU), a reduced instruction set computer (RISC) processor with an advanced RISC machine (ARM) core, etc. The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like. Memory can include, for example, a non-transitory memory, a non-transitory processor readable medium, a non-transitory computer readable medium, non-volatile memory, dynamic RAM (DRAM), volatile memory, ferroelectric RAM (FRAM), first-in-first-out (FIFO) memory, last-in-first-out (LIFO) memory, stack memory, non-volatile RAM (NVRAM), static RAM (SRAM), a cache, a buffer, a semiconductor memory, a magnetic memory, an optical memory, a flash memory, a flash card, a compact flash card, memory cards, secure digital memory cards, a microcard, a minicard, an expansion card, a smart card, a memory stick, a multimedia card, a picture card, flash storage, a subscriber identity module (SIM) card, a hard drive (HDD), a solid state drive (SSD), etc. The memory can be configured to store code, instructions, applications, software, firmware and/or data, and may be external, internal, or both with respect to the processor.

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy.

As used herein, welding-type refers to welding, cladding, brazing, plasma cutting, induction heating, carbon arc cutting, and/or hot wire welding/preheating (including laser welding and laser cladding), carbon arc cutting or gouging, and/or resistive preheating.

As used herein, welding-type power refers power suitable for welding, cladding, brazing, plasma cutting, induction heating, carbon arc cutting, and/or hot wire welding/preheating (including laser welding and laser cladding), carbon arc cutting or gouging, and/or resistive preheating.

As used herein, a welding-type power supply and/or power source refers to any device capable of, when power is applied thereto, supplying welding, cladding, brazing, plasma cutting, induction heating, laser (including laser welding, laser hybrid, and laser cladding), carbon arc cutting or gouging, and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

Disabling of circuitry, actuators, and/or other hardware may be done via hardware, software (including firmware), or a combination of hardware and software, and may include physical disconnection, de-energization, and/or a software control that restricts commands from being implemented to activate the circuitry, actuators, and/or other hardware. Similarly, enabling of circuitry, actuators, and/or other hardware may be done via hardware, software (including firmware), or a combination of hardware and software, using the same mechanisms used for disabling.

What is claimed is:

1. A method of identifying a welding asset, comprising:
receiving, at a welding asset tracking server, a selection signal representative of a selection of a particular welding asset; and
sending, via communication circuitry of the welding asset tracking server, a locating output command to a hub retained by the particular welding asset the locating output command comprising a command for the particular welding asset to emit a locating output through an asset interface of the particular welding asset,
the locating output command being sent from the welding asset tracking server to the hub through a welding asset tracking network, the welding asset tracking network comprising at least one welding asset retaining a gateway in communication with both the hub and the welding asset tracking server, the gateway comprising long range communication circuitry through which the gateway is in communication with the welding asset tracking server, and short range communication circuitry through which the gateway is in communication with the hub.

2. The method of claim 1, wherein the asset interface comprises one or more input devices configured to receive a controlling input based upon which an operation of the particular welding asset is controlled, the asset interface further comprising one or more output devices configured to provide one or more outputs relating to the operation of the particular welding asset.

3. The method of claim 1, wherein the locating output comprises an imperceptible output that is imperceptible to senses of a human.

4. The method of claim 1, wherein the at least one welding asset comprises at least one of a wire feeder, welding power supply, welding helmet, air-purifying respirator, welding gun, grinder, fume extractor, foot pedal, or power supply pendant, or the particular welding asset comprises a wire feeder or welding power supply.

5. The method of claim 2, further comprising outputting the locating output from the one or more output devices of the asset interface of the particular welding asset.

6. The method of claim 3, further comprising:
identifying, from a set of welding assets stored in a welding asset tracking database, a subset of welding assets that have the asset interface through which the imperceptible output can be emitted; and
sending data representative of the subset of welding assets to a user device in communication with the welding asset tracking server,
a subset size of the subset of welding assets being smaller than a set size of the set of welding assets, and the particular welding asset belonging to the subset of welding assets.

7. The method of claim 2, further comprising:
identifying, from a set of welding assets stored in a welding asset tracking database, a subset of welding assets that have the asset interface through which the locating output can be emitted; and
sending data representative of the subset of welding assets to a user device in communication with the welding asset tracking server,
a subset size of the subset of welding assets being smaller than a set size of the set of welding assets, and the particular welding asset belonging to the subset of welding assets.

8. The method of claim 1, wherein the locating output comprises a perceptible output that is perceptible to senses of a human.

9. The method of claim 1, wherein the at least one welding asset retaining the gateway in communication with the welding asset tracking server comprises a first welding asset retaining a first gateway in communication with the welding asset tracking server and a second welding asset retaining a second gateway in communication with the welding asset tracking server, the first gateway or the second gateway being in direct, or indirect, communication with the hub.

10. The method of claim 1, wherein the long range communication circuitry is configured for communications using a cellular or IEEE 802.11 standard, and the short range communication circuitry is configured for communications using a short wavelength ultra-high frequency protocol, an IEEE 802.15.4 standard protocol, a near field communication (NFC) protocol, or a radio frequency identification (RFID) protocol.

11. A welding asset tracking system, comprising:
a welding asset tracking network comprising at least one welding asset retaining a gateway, the gateway comprising long range communication circuitry, through which the gateway is in communication with a welding asset tracking server, and short range communication circuitry, through which the gateway is in communication with a hub of a particular welding asset; and
the welding asset tracking server comprising communication circuitry in communication with the long range communication circuitry of the gateway retained by the at least one welding asset of the welding asset tracking network, the communication circuitry configured to:
receive a selection signal representative of a selection of the particular welding asset, and
send to the hub of the particular welding asset, via the welding asset tracking network, a locating output command for the particular welding asset to emit a locating output through an asset interface of the particular welding asset.

12. The system of claim 11, wherein the asset interface comprises one or more input devices configured to receive a controlling input based upon which an operation of the particular welding asset is controlled, the asset interface further comprising one or more output devices configured to provide one or more outputs relating to the operation of the particular welding asset.

13. The system of claim 12, wherein the locating output comprises an imperceptible output that is imperceptible to senses of a human.

14. The system of claim 13, wherein the imperceptible output comprises a light or sound that is invisible or inaudible to the senses of the human.

15. The system of claim 11, wherein the locating output comprises a perceptible output that is perceptible to senses of a human.

16. The system of claim 11, wherein the locating output comprises an imperceptible output that is imperceptible to senses of a human, the welding asset tracking server further comprising processing circuitry configured to identify, from a set of welding assets stored in a welding asset tracking database, a subset of welding assets that have the asset interface through which the imperceptible output can be emitted, the communication circuitry being configured to send data representative of the subset of welding assets to a user device, wherein a subset size of the subset of welding assets is smaller than a set size of the set of welding assets, and the particular welding asset belongs to the subset of welding assets.

17. The system of claim 11, wherein the at least one welding asset comprises at least one of a wire feeder, welding power supply, welding helmet, air-purifying respirator, welding gun, grinder, fume extractor, foot pedal, or power supply pendant, or the particular welding asset comprises a wire feeder or welding power supply.

18. The system of claim 12, further comprising the particular welding asset comprising the hub and the asset interface, the hub being in communication with the short range communication circuitry of the gateway, and the one or more output devices of the asset interface configured to output the locating output in response to receiving the locating output command.

19. The system of claim 11, wherein the at least one welding asset retaining the gateway comprises a first welding asset retaining a first gateway in communication with the welding asset tracking server and a second welding asset retaining a second gateway in communication with the welding asset tracking server the first gateway or the second gateway being in direct or indirect communication with the hub.

20. The system of claim 11, wherein the welding asset tracking server further comprises processing circuitry configured to identify, from a set of welding assets stored in a welding asset tracking database, a subset of welding assets that have the asset interface through which the locating output can be emitted, the communication circuitry being configured to send data representative of the subset of welding assets to a user device, wherein a subset size of the subset of welding assets is smaller than a set size of the set of welding assets, and the particular welding asset belongs to the subset of welding assets.

* * * * *